April 7, 1931. O. D. STOKES 1,800,113
ATTACHMENT FOR LAWN MOWERS
Filed Oct. 8, 1928

Inventor:
O. D. Stokes
by C. A. Snow & Co.
his Attys.

UNITED STATES PATENT OFFICE

ORRIN D. STOKES, OF LOS ANGELES, CALIFORNIA

ATTACHMENT FOR LAWN MOWERS

Application filed October 8, 1928. Serial No. 311,192.

This invention aims to provide a novel means whereby a rake may be mounted on a lawn mower to comb and raise the grass, before the grass is engaged between the rotatable cutter and the fixed shear.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that change in the precise embodiment of the invention herein disclosed, may be made within the scope of what is claimed, without departing from the spirit of the invention.

In the accompanying drawings:—

Figure 1:
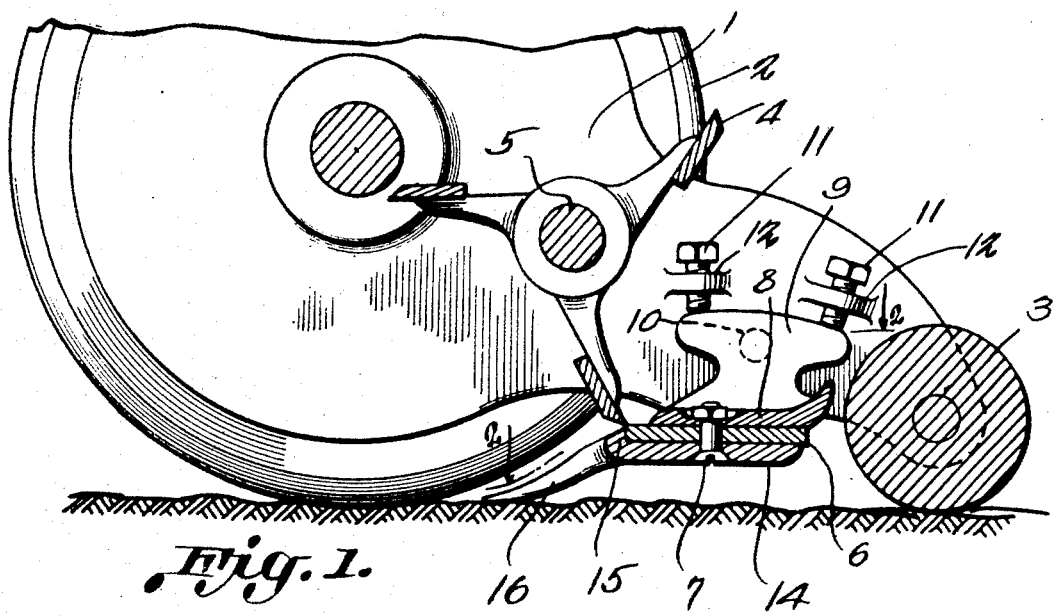
Figure 1 is a vertical sectional view showing a lawn mower equipped with the device forming the subject matter of this application.
Figure 2:
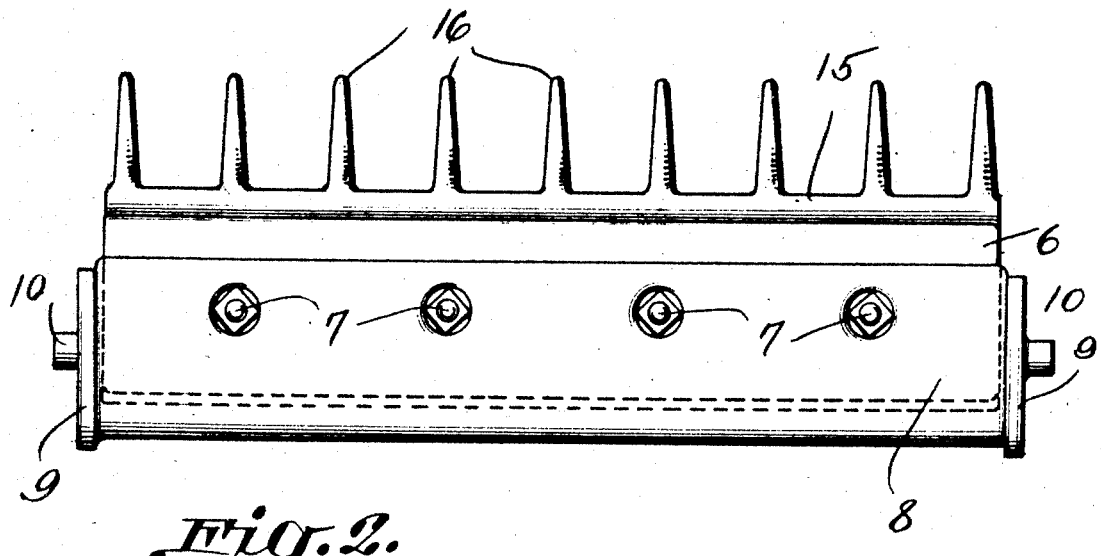
Figure 2 is a section taken about on the line 2—2 of Figure 1, the view being, in such, a top plan of the rake and attendant parts.

The device forming the subject matter of this application may be used on any kind of a lawn mower, but by way of illustration, there is shown the frame 1 of a lawn mower, whereon the ground wheels 2 are journaled, the rear roller 3 being mounted to turn on the mower frame. The rotatable blades 4 are carried by a shaft 5 that is driven from the wheels 2, in the usual way. The rotatable blades 4 cooperate with a fixed shear bar 6 connected by securing elements 7, such as bolts, with a support 8, in the form of a bar, the bar 8 having upstanding flanges 9 at its ends, the flanges 9 being pivotally mounted at 10 on the side portions of the motor frame 1. Screws 11 are threaded into lugs 12 and cooperate with the upper edges of the flanges 9 to adjust the shear bar 6.

The description given hereinbefore explains, briefly, one of the many kinds of lawn mowers, with which the device forming the subject matter of this application may be assembled.

In carrying out the invention, there is provided a plate 14, constituting a carrier, the plate being of substantially the same area as the bar 8. The carrier or plate 14 is located beneath the shear bar 6 and is held on the shear by the securing elements 7. Along its forward edge, the carrier plate 14 has a rib 15 which engages the forward edge of the shear bar 6. The rib 15, however, terminates short of the upper edge of the shear bar 6 so that the shear bar will still present an edge with which the rotatable blades 4 can cooperate in cutting the grass. The teeth 16 extend downwardly and forwardly from the rib 15 and from the plate 14. The teeth 16 constitute a rake which serves to comb up and elevate the grass, so that the grass can be cut readily by the blades 4 and the fixed shear bar 6. When the shear bar 6 is adjusted by means of the screws 11, the carrier plates 14 and the rake teeth 16 are adjusted also. The rib 15 strengthens the mounting of the carrier plate 14 on the shear bar 6. The bolts 7 which hold the shear bar 6 on the support 8 serve also, to hold the carrier 14 and the rake teeth 16 in place, and it is not necessary to make any additional holes for the mounting of the rake.

By way of summary, it may be stated that the device described embodies a carrier plate 14 provided along its forward edge with a continuous, upstanding, longitudinal rib 51, and rake teeth 16 extended from the plate 14 and from the rib 15; the continuous rib 15 having three functions, in that it constitutes a reinforcement connecting the teeth 16 with the plate 14, an abutment for the forward edge of the fixed shear 6 of a lawn mower, and a means for guiding the grass to be cut to the upper edge of the shear 6 throughout the entire distance between any two adjoining teeth 16.

Having thus described the invention, what is claimed is:

In a device of the class described, a carrier plate provided along its forward edge with a continuous, upstanding, longitudinal rib, and rake teeth extended from the plate and from the rib; the continuous rib having three functions, in that it constitutes a reinforcement connecting the teeth with the plate, an abutment for the forward edge of the fixed shear of a lawn mower, and a means for guiding the grass to be cut to the upper edge of the shear throughout the entire distance between any two adjoining teeth.

In testimony that I claim the foregoing as my own, I have hereto affixed my signature.

ORRIN D. STOKES.